(12) United States Patent
Blaschke

(10) Patent No.: US 6,553,860 B2
(45) Date of Patent: Apr. 29, 2003

(54) SWITCHING DEVICE FOR BICYCLE GEAR MECHANISMS

(75) Inventor: Georg Blaschke, Geldersheim (DE)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/766,909

(22) Filed: Jan. 22, 2001

(65) Prior Publication Data
US 2001/0029803 A1 Oct. 18, 2001

(30) Foreign Application Priority Data
Jan. 22, 2000 (DE) .......................... 100 02 741

(51) Int. Cl.[7] ................................. F16C 1/12
(52) U.S. Cl. ....................... 74/501.6; 74/502.2
(58) Field of Search ................ 74/501.6, 502.2, 74/502, 504, 507

(56) References Cited

U.S. PATENT DOCUMENTS

| | | | | |
|---|---|---|---|---|
| 5,044,213 A | * | 9/1991 | Nagano | 74/502.2 |
| 5,201,236 A | * | 4/1993 | Nagano | 74/502.2 |
| 5,203,213 A | * | 4/1993 | Nagano | 74/502.2 |
| 5,904,069 A | | 5/1999 | Rau et al. | 74/473.14 |
| 6,220,111 B1 | | 4/2001 | Chen | 74/473.15 |
| 6,367,347 B1 | * | 4/2002 | Blaschke et al. | 74/502.2 |

FOREIGN PATENT DOCUMENTS

| DE | 35 46 076 | 7/1986 | ........ B62M/25/04 |
|---|---|---|---|
| DE | 90 15 515.7 | 11/1990 | |

* cited by examiner

Primary Examiner—Chong H. Kim
(74) Attorney, Agent, or Firm—Milan Milosevic; Lisa Wunderlich

(57) ABSTRACT

A switch for actuating at least one gear mechanism on a bicycle includes a housing and a movement element movably arranged relative to the housing and including a transmission means for controlling the gear mechanism in a tensioning direction and in a release direction. A first pawl interacts with a first latching toothing arrangement in the housing. The individual gear stages in the switch are produced with a form fit via one or more controllable pawls. The switch is designed as a trigger switch for shifting through a plurality of gear stages in the tensioning direction and in the release direction by a single switching movement.

26 Claims, 4 Drawing Sheets

SWITCHING DEVICE FOR BICYCLE GEAR MECHANISMS

BACKGROUND OF THE INVENTION

1. Field of the Invention

The present invention relates to a switch device for actuating bicycle gear mechanisms.

2. Description of the Related Art

German Utility Model 90 15 515 discloses a stepping switch intended for controlling bicycle gear mechanisms. A lever of the switch includes a pair of pawls which facilitate the switching of a respectively gear by a desired displacement or a switchover displacement via a toothed disk connected to a cable drum. The actuating displacement of the lever is always equal and the lever always return to its standby position once actuation has taken place. Friction or positioning devices are provided to retain the cable drum in the respectively engaged position. The friction or positioning devices are arranged in the housing of the switch and interact with the cable drum and/or the toothed disk. The pawls are arranged on the lever in relation to the housing such that when one pawl latches into the toothed disk, the other pawl is disengaged by a curved disengagement element connected to the housing. Accordingly, only one of the pawls is operative during each switching operation. The switch is designed as a trigger switch with the possibility of switching in each case one gear in both directions. It is also possible for a number of gear stages to be switched using this solution, although this is irrelevant to the explanation of the switching principle.

The essence of a trigger switch is sufficiently clearly defined in respect of its actuation, but is not realized to a sufficient extent in technical terms as far as the individual gear positions of the cable drum are concerned. The position of the cable drum for the individual gears is formed by a latching device which is only active up to a certain retaining force and possibly also prevents the positioning of precise switchover displacements.

SUMMARY OF THE INVENTION

The object of the present invention is to provide a trigger switch connected to a bicycle gear mechanism by a transmission means in which each gear stage is produced with a form fit and thus in a precise manner, the trigger switch including an operating element which returns into its starting position even when more than one gear stage is switched in one of the two directions.

The object of the present invention is achieved by a switch for actuating at least one gear mechanism on a bicycle including a housing and a movement element movable relative to the housing and having a transmission means for controlling the at least one gear mechanism in a tensioning direction and in a release direction. A first pawl is arranged for interacting with a first latching toothing arrangement, wherein the first pawl and the first latching toothing arrangement are operatively arranged for producing a form fit for each individual gear stage of the at least one gear mechanism. The switch further includes a trigger switch means for effecting a switching operation through plural gear stages in said tensioning direction and said release direction by a single switching movement.

According to the present invention, a switch includes a movement element connected to a transmission means whose displacement is clearly carried through to one or more gear stages via a form fit. In addition, the movement element according to the present invention is retained in the respective gear stage via a form fit. Therefore, it is possible to account for switchover displacements of any desired magnitude, especially for the displacement of the movement element in a tensioning direction. The switch may be equipped with a single operating element. Alternatively, the switch may have a tensioning element for tensioning the transmission means and a release element for releasing the transmission means. In each case, the position of the movement element is changed by the engagement of pawls in latching toothing arrangements. The movement element itself is connected to a latching toothing arrangement on a housing via a pawl. The interaction of all the pawls may be controlled. Depending on the movement direction, the pawls are either in engagement or have to be disengaged. The interaction of the pawls is assisted by a transmission element which primarily has the task of accommodating the switching displacements by way of the operating element and of controlling the pawl which is arranged between the housing and the movement element. This control is possible in the release direction by the pawl being disengaged. The disengaged pawl allows the movement element to be pushed via a tensile force of the transmission means to the next gear position. The operating element is retained such as, for example, by springs in a central or rest position into which the operating element returns again, without the action of force, once switching has taken place. In the embodiment having a tensioning element and a release element, these elements may also be retained in a central or rest position by springs. It is irrelevant here whether just one gear stage or a number of gear stages has or have been switched in one direction.

As far as the design of the proposed switch is concerned, the switch according to the present invention may be a twist-grip switch, rotary switch, thumb switch or push-button switch in the translatory or rotary movement direction. Each case involves a housing with a latching toothing arrangement in which a controllable pawl engages, the pawl being connected to the movement element. The controllable pawl is controlled by a disengagement finger on the transmission element. The transmission element is connected by a controllable pawl to either the operating element or the release element. The tensioning element may be connected directly to the movement element via a controllable pawl. The two pawls mentioned above are directed counter to one another and each is controllable by a disengagement nose. The disengagement noses may be connected to the housing since, depending on the operating direction, they have to disengage one pawl or the other when the operating element and/or the tensioning element or control element leave their central position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
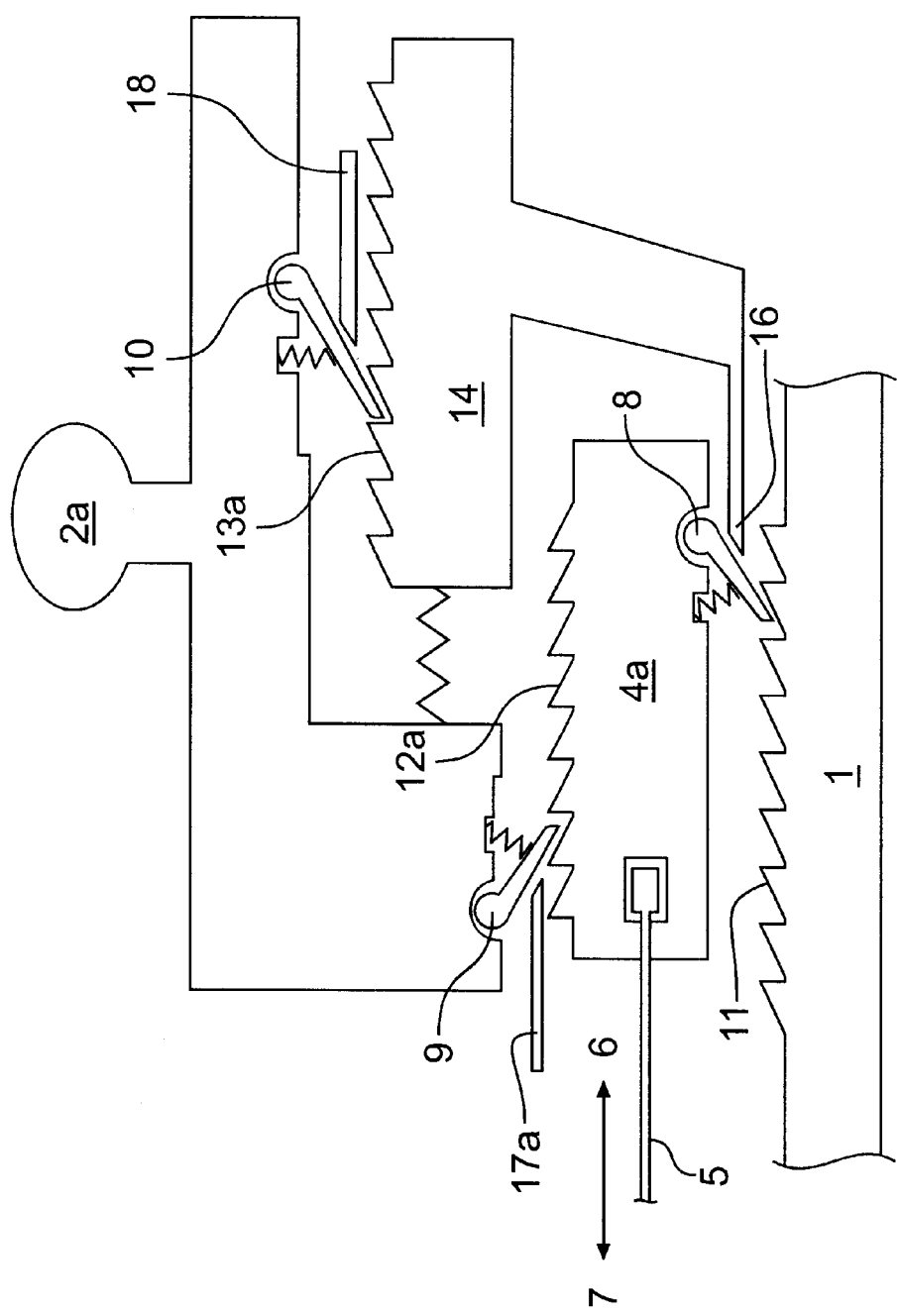
FIG. 1 is a schematic diagram of a pawl-controlled switch according to an embodiment of the present invention with a housing and an operating element which can control a movement element connected to a gear mechanism of a bicycle by a transmission means.

A pawl-controlled trigger switch according to an embodiment of the present invention is shown in FIG. 1 and includes a housing 1 with a first latching toothing arrangement 11. A first pawl 8 is resiliently arranged on a movement element and engages the first latching arrangement 11. The movement element 4a is connected to a transmission means 5 which controls the gear stages of a bicycle gear mechanism (not shown). The transmission means 5 is a traction cable which is retained under tensile stressing in a tensioning direction 6 by a spring acting in the gear mechanism of a bicycle. The transmission means 5 may be slackened in a release direction 7 which is directed counter to the tensioning direction 6 which allows the gear stages in the gear mechanism to be switched by the work of the spring in the gear mechanism. To move movement element 4a and the transmission means 5 in the release direction, the first pawl 8 must be disengaged from the first latching toothing arrangement 11. A disengagement finger 16 arranged on a transmission element 14 for disengaging the first pawl 8 and is arranged to follow the first pawl 8 in the release direction with a change in location of the movement element 4a. Therefore, when a gear change in the tensioning direction 6 is required, the first pawl 8 may be immediately disengaged. The movement element 4a is connected to an operating element 2a via a second pawl 9 which engages in a second latching toothing arrangement 12a arranged on the movement element 4a. The operating element 2a is maintained in the rest position shown in FIG. 1 by resilient elements such as springs (not shown) and may be moved in the release direction 7 and the tensioning direction 6 for effecting a change in the gear stage of a bicycle gear mechanism via the transmission means 5. The second pawl 9 is resiliently mounted on the operating element 2a. The second pawl 9 is disengagable by a first disengagement nose 17a when the operating element 2a is moved in the release direction 7. In addition, the operating element 2a is connected to the transmission element 14 by a third pawl 10 which engages a third latching toothing arrangement 13a arranged on the transmission element 14. The third pawl 10 is resiliently mounted on the operating element 2a. The third pawl 10 is disengagable by a second disengagement nose 18 when the operating element 2a is moved in the tensioning direction 6.

The first pawl 8 is directed counter to the tensile force of the spring in the gear mechanism. That is, the first pawl 8 holds the movement element 4a in a position and is supported in the first latching toothing arrangement 11 on the housing 1 against the urgency of the spring in the gear mechanism when the position of the movement element corresponds to one of the gear stages in the gear mechanism. If the movement element 4a is to be moved in the release direction 7, then the first pawl 8 has to be disengaged from the first latching toothing arrangement 11 by the disengagement finger 16. Accordingly, switching of the gear stages in the release direction 7 is possible only by movement of the operating element 2a in the release direction 7 which causes the transmission element 14 to be carried along in the release direction by the third pawl 10 which is in engagement with the third latching toothing arrangement 13a. The movement of the transmission element 14 in the release direction causes the disengagement finger 16 the disengage the first pawl 8 from the first latching toothing arrangement 11 of the housing 1, thereby allowing the movement element 4a to move on into the next latching stage of the first latching toothing arrangement 11. During movement of the operating element 2a in the release direction, the second pawl 9 is disengaged from the second latching toothing arrangement 12a of the movement element 4a by the first disengagement nose. The release of the second pawl 9 allows the movement of the movement element 4a in the release direction 7.

To effect a gear change in the tension direction so that the movement element 4a transports the transmission means 5 in the tensioning direction 6, the operating element 2a is moved in the tensioning direction 6 and the second pawl 9, which engages in the second latching toothing arrangement 12a of the movement element 4a, carries the movement element 4a along directly until the displacement of a desired gear stage has been achieved. The transmission element 14, which is connected resiliently to the operating element 2a, is carried along therewith. Accordingly, the disengagement finger 16 likewise moves back from the first pawl 8 and does not prevent it from engaging in the first latching toothing arrangement 11 of the housing 1. Irrespective of the number of gear stages through which shifting is to take place, latching of the first pawl 8 into the first latching toothing arrangement 11 of the housing 1 is permitted when a certain switchover displacement is produced. When the operating element 2a is moved in the return direction, the movement element 4a moves with the operating element until the first pawl 8 latches definitively into the first latching toothing arrangement 11, the switchover displacement is reversed.

Figure 2:
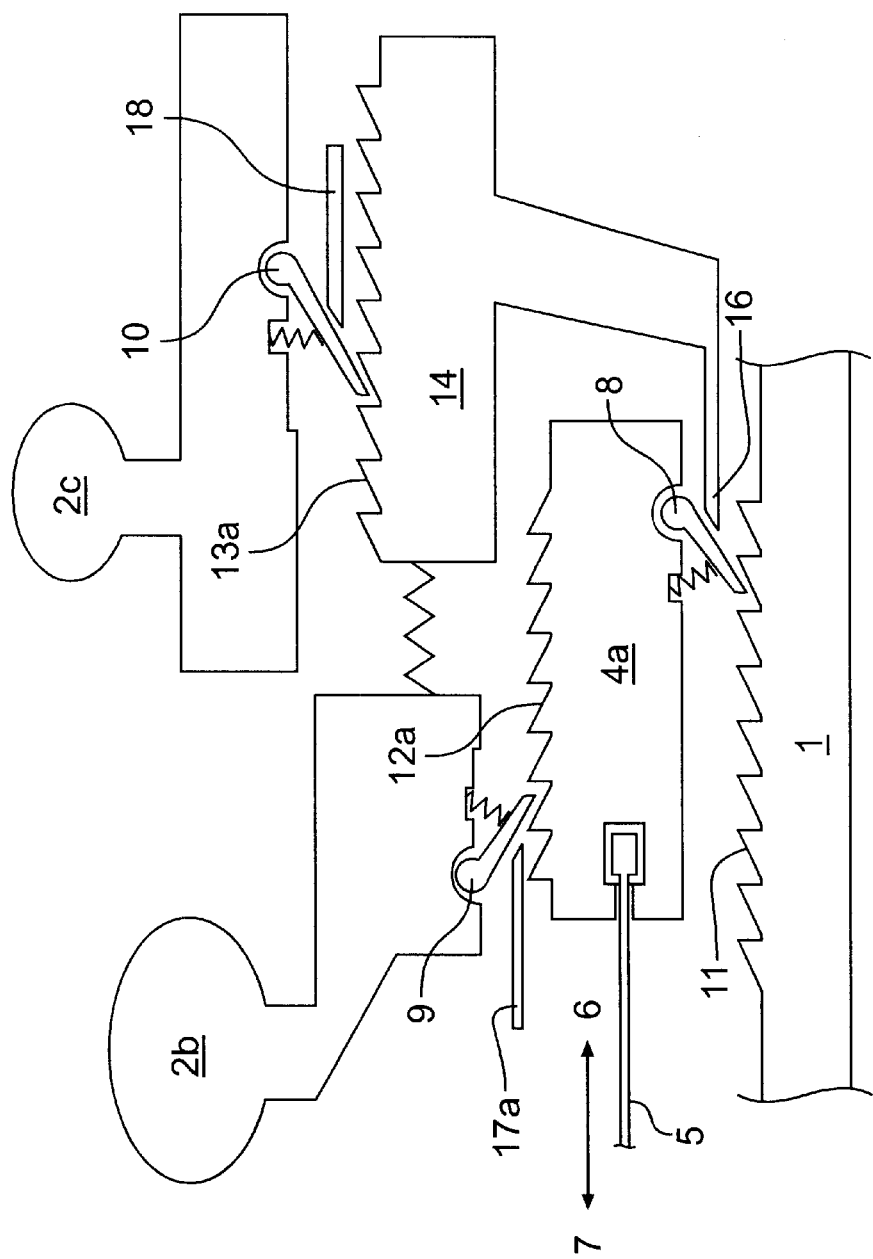
FIG. 2 is a schematic diagram of a pawl-controlled switch according to another embodiment of the present invention with a tensioning element and a release element for controlling the movement element, the tensioning element being connected to the movement element via a pawl and the release element being connected to the movement element via a transmission element.

FIG. 2 shows a further embodiment of a switch according to the present invention which differs from the embodiment of FIG. 1 in that the operating element 2a is separated into a separate tensioning element 2b and a release element 2c. The tensioning element 2b is operable independently of the release element 2c. The tensioning element 2b is connected to the transmission element 14 by a resilient element such as a spring, thereby producing an indirect connection between the tensioning element 2b and the release element 2c. The indirect connection is required because the release element 2c is connected to the transmission element 14 via the third pawl 10. When the tensioning element 2b is operated, the transmission element 14 and the release element 2c are transported further in the tensioning direction 6 until the third pawl 10 is released from the third latching toothing arrangement 13a in the transmission element 14 by the second disengagement nose 18. The tensioning element 2b is connected to the latching toothing arrangement 12a of the movement element 4a via the second pawl 9. There is no change in functioning when the movement element 4a is tensioned in the tensioning direction relative to the embodiment of FIG. 1. There is also no change when the release element 2c is moved in the release direction 7 in that the first pawl 8 is disengaged from the first latching toothing arrangement 11 of the housing 1, since the disengagement finger 16 of the transmission element 14 immediately disengages said first pawl 8.

Figure 3:
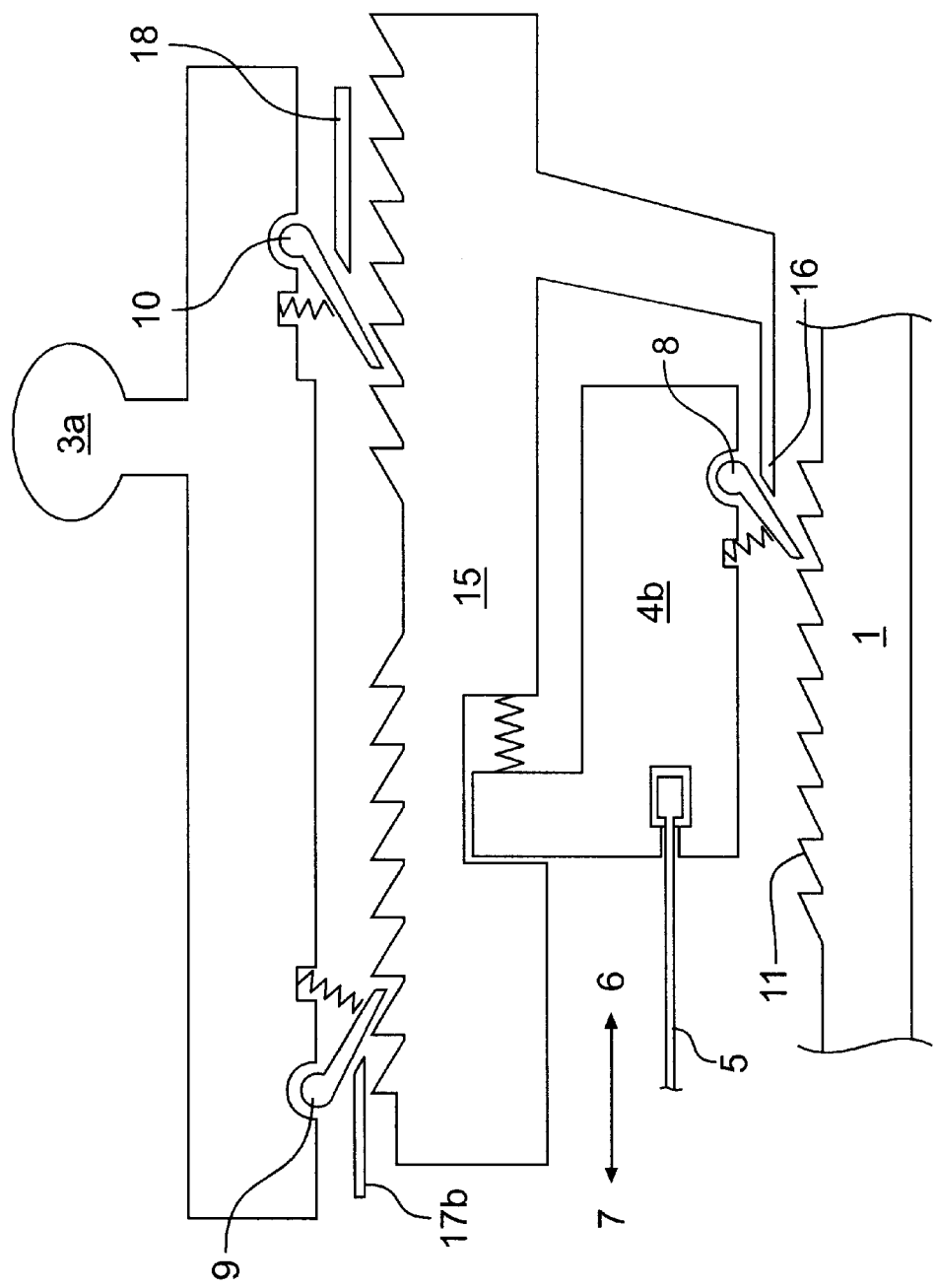
FIG. 3 is a schematic diagram of a pawl-controlled switch according to another embodiment of the present invention with an operating element connected to a movement element by a transmission element.

FIG. 3 discloses a switch for performing the same functions as the switch according to FIG. 1. However, the switch of FIG. 3 includes an operating element 3a equipped with both the second pawl 9 and the third pawl 10. The second pawl 9 is controlled by a first disengagement nose 17b and the third pawl 10 is controlled by the second disengagement nose 18. The second and third pawls 9, 10 respectively act on the second latching toothing arrangement 12a and the third latching toothing arrangement 13a arranged on a transmission element 15. The second pawl 9 is directed counter to the third pawl 10 and the second latching toothing arrangement 12a and the third latching toothing arrangement 13a are likewise directed counter to one another. A movement element 4b is carried along by the transmission element 15 both in the tensioning direction 6 and in the release direction 7. To realize small disengagement displacements, the movement element 4b may be connected to the transmission element 15 via a spring. The transmission element 15 includes the disengagement finger 16 which disengages the first pawl 8 from its first latching toothing arrangement 11 when a change in gear stage takes place in the release direction 7. The first and second disengagement noses 17b and 18 are positioned such that the second pawl 9 and the third pawl 10 engage in their latching toothing arrangements 12a and 13a if the operating element 3a is located in the a position, which is defined by springs (not shown here). If the operating element 3a is moved in the tensioning direction 6, the second pawl 9 conveys the transmission element 15 in this same tensioning direction 6. The third pawl 10 is disengaged by the second disengagement nose 18 even with slight displacement of the operating element 3a, thereby clearing the path for a displacement of the movement element 4b. In the tension direction, the movement element 4a is carried along by the transmission element 15 while the first pawl 8 jumps over the first latching toothing arrangement 11 of the housing 1 and remaining ever-ready for engagement. The disengagement finger 16 moves back with the transmission element 15.

With respect to the transmission of a movement in the release direction 7 in FIG. 3, the conditions are reversed and the transmission element 15 is displaced in the release direction 7 by the operating element 3a. The disengagement nose 17b disengages the second pawl 9 to release the movement for the transmission element 15. For the case where it is not immediately possible for the first pawl 8 to be disengaged from the first latching toothing arrangement 11 of the housing 1, the movement element 4b is resiliently carried along by the transmission element 15, which disengages the first pawl 8 before the movement element 4b is transported in the release direction 7. An appropriate design of the spring connection between the movement element 4b and the transmission element 15 allows the switching of the bicycle gear mechanism to proceed at a high speed since the first pawl 8 is drawn into engagement with the following tooth of the first latching toothing arrangement 11 by the spring of the gear mechanism.

Figure 4:
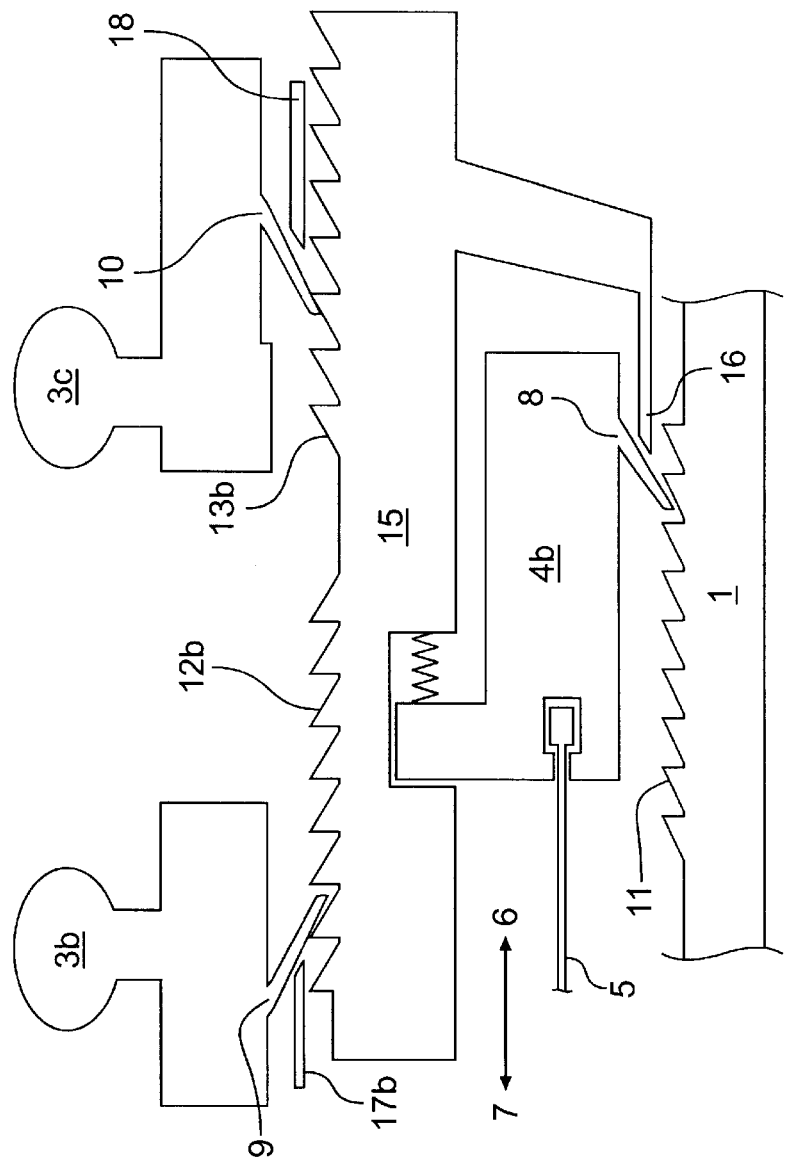
FIG. 4 is a schematic diagram of a pawl-controlled switch according to another embodiment of the present invention analogous to the design according to FIG. 3 in which a tensioning element and a release element are each independently connected to a movement element by a transmission element.

According to the embodiment of FIG. 4, a switch is shown in which the operating element 3a of the embodiment in FIG. 3 is divided up into a tensioning element 3b and a release element 3c. In this case, there is no change for the movement of the movement element 4b in both the tension direction 6 and the release direction 7. The switching of the tensioning element 3b produces a certain movement of the release element 3c which lasts until the third pawl 10 has been disengaged from the latching toothing arrangement 13b. Conversely, movement in the tensioning element 3b may be registered when the release element 3c is moved in the release direction 7.

FIG. 4 also shows that pawls 8, 9, 10 may comprise resilient material such as plastic integrally connected with the movement element 4b and tensioning and release elements 3b, 3c. These pawls may also be used in any of the previous embodiments shown in FIGS. 1–3 instead of pivotally mounted pawls having resilient springs holding them in the latched position.

The advantage of the switching principle of the switches according to FIGS. 1 to 4 is that they allow the production of a multiplicity of trigger switches which can be arranged in a wide range of different locations of a bicycle. It is cost-effective to produce the switches in plastic. Furthermore, the present invention also allows for the switching capability of one or more gear stages in the bicycle gear mechanism to be produced with sufficiently high precision.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A switch for actuating at least one gear mechanism on a bicycle, comprising:

a housing;

a movement element movable relative to said housing and having a transmission means for controlling the at least one gear mechanism in a tensioning direction and in a release direction;

a first pawl arranged for interacting with a first latching toothing arrangement, wherein said first pawl and said first latching toothing arrangement are operatively arranged for producing a form fit for individual gear stages of the at least one gear mechanism; and trigger switch means for effecting a switching operation trough plural gear stages in said tensioning direction and said release direction by a single switching movement, the trigger switch means including an operating mechanism for changing the gear stages, said operating mechanism returning to a rest position upon completion of the switching operation, the trigger switch means including a transmission element for transmitting control movements arranged between said operating mechanism and said movement element, a second pawl engageable with a second latching toothing arrangement such that a movement of the operating mechanism in the tensioning direction is transferred to the movement element;

a third pawl arranged on said operating mechanism, the third pawl engageable with a third latching tooting arrangement arranged on the transmission element such that a movement of the operating mechanism in the release direction is transferred to the transmission element.

2. The switch of claim 1, wherein said operating mechanism comprises a tensioning element arranged for displacing the movement element in the tensioning direction and a release element arranged for displacing the movement element in the release direction, said tensioning element and said release element both returning to respective rest positions upon completion of the switching operation.

3. The switch of claim 1, wherein said operating mechanism is operatively connected with said movement element via said first pawl said second pawl, and said third pawl.

4. The switch of claim 3, wherein said transmission element comprises a disengagement finger arranged for interacting with said first pawl for releasing said movement element in the release direction when said operating mechanism is moved in the release direction.

5. The switch of claim 4, wherein said first pawl is arranged between said housing and said movement element.

6. The switch of claim 5, wherein said first pawl is arranged on the movement element and said first latching toothing arrangement is arranged on said housing.

7. The switch of claim 6, wherein said second pawl is arranged between said movement element and said operating mechanism for carrying along said movement element in the tensioning direction when said operating mechanism moves in the tensioning direction.

8. The switch of claim 7, wherein said second pawl is arranged on said operating mechanism and interacts with a second latching toothing arrangement arranged on said movement element.

9. The switch of claim 2, wherein the second pawl is arranged between said movement element and said tensioning element for carrying along said movement element in the tensioning direction when said tensioning element moves in the tensioning direction.

10. The switch of claim 9, wherein said second pawl is arranged on said tensioning element and interacts with a second latching toothing arrangement arranged on said movement element.

11. The switch of claim 2, wherein the transmission element is arranged between said release element and said movement element, said third pawl arranged between said transmission element and said release element for releasing said movement element when said release element is operated in the release direction.

12. The switch of claim 11, wherein said third pawl is arranged on said release element.

13. The switch of claim 3, wherein said trigger switch means further comprises a first disengagement nose and a second disengagement nose, said first disengagement nose disengaging said second pawl when said operating mechanism is moved in the release direction and said second disengagement nose disengaging said third pawl when said operating mechanism is moved in the tensioning direction.

14. The switch of claim 13, wherein said first and second disengagement noses are arranged on said housing.

15. The switch of claim 3, wherein said second pawl and said third pawl are arranged on said operating mechanism and both interact with said transmission element, said transmission element having the second latching arrangement arranged for interaction with said second pawl, said first and second latching toothing arrangements being directed counter to one another and arranged so that said second pawl carries along said transmission element in the tensioning direction when the operating mechanism is moved in the tensioning direction and said third pawl carries along said transmission element in the release direction when said operating mechanism is moved in the release direction.

16. The switch of claim 15, wherein said trigger switch means further comprises a first disengagement nose and a second disengagement nose, wherein said first disengagement nose is operatively arranged for disengaging said second pawl when said third pawl is moved in the release direction and said second disengagement nose is operatively arranged for disengaging said third pawl when said second pawl is moved in the tensioning direction.

17. The switch of claim 15, wherein said operating mechanism comprises a tensioning element and a release element and said second pawl is arranged between said transmission element and said tensioning element for carrying along said transmission element in the tensioning direction when said tensioning element is moved in the tensioning direction, wherein said movement element moves in the tensioning direction along with said transmission element.

18. The switch of claim 17, wherein said second pawl is arranged on said tensioning element and interacts with a second latching toothing arrangement arranged on said transmission element.

19. The switch of claim 15, wherein said operating mechanism comprises a tensioning element and a release element and said third pawl is arranged between said transmission element and said release element for carrying along said transmission element in the release direction when said release element is moved in the release direction, wherein said movement element moves in the release direction along with said transmission element.

20. The switch of claim 19, wherein said third pawl is arranged on said release element and interacts with a third latching toothing arrangement arranged on said transmission element.

21. The switch of claim 3, wherein said movement element has a form-fitting connection with said transmission element at least in the tensioning direction.

22. The switch of claim 3, wherein said first pawl is pivotally connected to said movement element and said second and third pawls are pivotally connected to said operating mechanism, and wherein each of said first, second, and third pawls comprises a spring retaining said pawls under prestressing in an engagement position.

23. The switch of claim 3, wherein said first pawl is pivotally connected to said movement element and said second and third pawls are pivotally connected to said operating mechanism and said first, second, and third pawls comprise detent pawls made of resilient material and joined at said movement element and said operative mechanism such that said first, second, and third pawls interact with associated latching toothing arrangements.

24. The switch of claim 23, wherein said pawls are connected as integral parts of said movement element and said operating mechanism.

25. The switch of claim 23, wherein said first, second, and third pawls are made of plastic.

26. The switch of claim 16, wherein the actuation of said movement element in the manner of a kinematic reversal occurs when said first, second and third pawls latch rather than being disengaged.

* * * * *